United States Patent

Huang

Patent Number: 5,402,602

Date of Patent: Apr. 4, 1995

[54] HEELING-IN AND TRANSPLANTING MEANS FOR EASY INDUCING AND CUTTING OF ROOTS

[76] Inventor: Tsun-Thin Huang, No. 3, Lane 78, An Ho Road, Sec. 1, Taipei, Taiwan, Prov. of China

[21] Appl. No.: 194,269

[22] Filed: Feb. 10, 1994

[51] Int. Cl.⁶ .............................................. A01G 9/02
[52] U.S. Cl. ........................................... 47/78; 47/66; 47/76
[58] Field of Search .................... 47/73 R, 76, 76 WB, 47/78 F

[56] References Cited

U.S. PATENT DOCUMENTS

| D. 243,112 | 1/1977 | Gross | 47/73 R |
| 3,091,896 | 6/1963 | Howard | 47/76 R |
| 3,094,810 | 6/1963 | Kalpin | 47/66 B |
| 3,328,913 | 7/1967 | Vogt | 47/73 R |
| 3,775,903 | 12/1973 | Pike | 47/66 B |
| 5,311,700 | 5/1994 | Thomas | 47/76 |

FOREIGN PATENT DOCUMENTS 1061564  9/1979  Canada ............. 47/76 WB

Primary Examiner—Henry E. Raduazo

[57] ABSTRACT

Disclosed is a heeling-in and transplating means for easy inducing and cutting roots comprising a culturing bag and being characterized in that the culturing bag is provided near a middle portion a partition which guides roots of a plant heeled in the culturing bag to grow and extend evenly and radially above the partition and then downward along an innner periphery of the culturing bag, a plurality of water-soluble root-inducing nutrient stripes attached to the inner periphery of the culturing bag below the partition, and a plurality of externally communicable eyelets provided at a lower portion of the nutrient stripes for guiding and cutting roots. When the culturing bag is to be used, first position it in a planting hole on the ground, and the partition is lifted to facilitate the filling in of culture medium. Then, the partition is lowered again and more culture medium is filled in the bag to an adequate thickness. After a sapling is heeled in the bag, bank adequate amount culture medium around the sapling, compact the soil, add other necessary protective or fixing means, and sufficiently irrigate water to the culturing bag.

6 Claims, 4 Drawing Sheets

HEELING-IN AND TRANSPLANTING MEANS FOR EASY INDUCING AND CUTTING OF ROOTS

BACKGROUND OF THE INVENTION

The present invention relates to a heeling-in and transplanting means for easy inducing and cutting of roots. In the conventional transplantation, it is inevitable to form considerable damage to the saplings which require, therefore, a quite long period of tending to recover their normal growing condition. In addition, the transplant survival percentage is largely varied depending on the transplanting season, quality of transplantation personnel, etc. It is especially important in the cutting and lifting of roots which usually requires skilled workers or serious harm might be caused to the plants and brings unimaginable lose. The critical points for successful transplanting of saplings include the clod carried by roots which should have dimensions suitable for the particular plant, and the safe transfer of saplings to the planting place.

In addition, the soil texture of stocking place, the lack of skilled workers, and the factors in seasons, climate, etc. all have important influences on the efficient operation and accurate quality control of culturing and transplanting of saplings. Due to these problems, the quality of landscaping plants can not be significantly upgraded.

To solve problems existed in the conventional transplanting of saplings, there are many pretty useful articles invented and commercially available in the market for this purpose. Such articles can be generally divided into two categories:

1. Hardware for use above ground: This may includes pot, trough, box, and pan made of wood, plastic, FRP, steel or other metal sheet, and precast concrete with adequate strength and being used above ground, as exemplified in FIG. 1.
2. Means for use under ground: This mainly includes cylindrical bags made of anticorrosion nonwoven cloth with a bottom made of water-impervious plastic sheet, etc. To use such bags, first dig a planting hole on the ground according to the desired dimensions of transplanting bag and then place the latter into the planting hole before a sapling is planted in the bag, as exemplified in FIG. 2A.

In both of the above two categories, the culturing articles are used as barriers to limit the roots of plants therein lest the roots should extend downward and laterally. The common characteristic of these two categories of articles is that all the roots of the plant grow within the articles. The disadvantages of pot, trough, etc. that are used above ground include inconvenience in management, entangled roots and poor growth condition of plants, and high cost of culturing. Since these are known drawbacks, they are not repeatedly discussed herein.

In the practical application, the transplanting bag for use under the ground utilizes the tight but finely porous texture of the nonwoven cloth to effectively limit the roots in the bag while the inside and outside of the bag are mutually communicable to allow proper exchange of soil, water, and nutrient thereof. Even if there are any roots extending out of the bag, they are delicate hair roots that can be easily extracted from the soil during transplanting.

That is, the damage in plant roots can be minimized if a nonwoven cloth transplanting bag is used. However, this advantage is limited to the short term use of a nonwoven transplanting bag. For some plants, such as Ficus, a longer term of culturing of seedling about six to eight months is required, following problems are found in such transplanting bag and need improvement:

1. Since nutrient is supplied within the bag, more serious entangling of roots is found in the transplanting bag, as seen in FIG. 2B:

It is a nature of the roots to turn or wind or form lateral roots when they are stopped from extending during the course of growth. So, the entangled roots of a plant is actually a response of strong struggling for living. If there are not effective means or ways to solve the natural need of plants to extend their roots, the entangled roots is inevitable.

Except the finely porous structure, the transplanting bag is substantially the same as those pot, trough, pan, etc. in the limited space and function it provides. That is, the nonwoven cloth transplanting bag does not have the necessary and effective means to prevent the forming of entangled roots in the bag. The nonwoven transplanting bag is, on the one hand, capable of limiting the roots within the bag, maintaining good exchange of water and nutrient inside and outside the bag, lowering the management cost, and assisting in good growth of the sapling, it on the other hand causes the sapling therein to have quicker growth speed and thicker roots than a sapling growing in the general pot or pan, etc. due to good supply of nutrient to the sapling therein, especially at the peripheral portion of the transplanting bag. The longer the sapling is cultured in the bag, the thicker and the more serious entangling of the roots will be which will speed the aging of the roots.

2. The sapling cultured in the nonwoven cloth transplanting bag has inferior growth and weather-resistant ability after being transplanted from the bag:

To many people's surprise, when a big tree is felled or transplanted, the roots thereof do not vertically and deeply extend into the ground but spread radially and horizontally. This phenomenon can be generally attributed to the following factors:

A. Due to changes in the soil and hardness of the terrane:

The critical hardness for the roots of plants to extend into the ground is about 25 mm (a value measured with a hardness meter) while the soil horizon of most regions having this hardness has a depth about 10 cm to serveral meters only. Under the circumstances, the roots of plants, when reach this depth under the ground, will keep extending along the soil horizon having this suitable hardness.

B. Being induced by suitable soil temperature and nutrient:

The richest nutrient and the best soil texture are contained in the top soil of terrane. Therefore, the plants, being induced by the nutrient and under the instinct of seeking for foods, will extend their roots into the top soil to a proper depth and then spread radially and horizontally to increase the absorption of nutrient and water and get good growth. In addition, the extensive grip of soil by the roots extending in a radial direction also makes the plants firmly and stably stand to pass the test of weather.

From the growth of plants in the natural environment, it can be clearly seen that only when the roots of a plant reach a proper depth and are permitted to have lateral roots, the plant can grow in a natural and healthy way. That is why an experienced planter often properly cut the unnecessary roots for the transplanted plant, because the lateral roots can be properly stimulated to grow in a more lively and more strong manner, just like the top buds are removed for the purpose to stimulate the growing of side buds.

From the above description, it can be seen that both the above two conventional heeling-in and transplanting means shall cause the entangled and early aged roots due to the limited space they could provide. Although the roots will not be damaged during transplanting if these means are used, the roots of transplanted plants usually have slowed growth and do not well radially extend, and therefore, the transplanted plants shall have poor weather-resistant ability and tend to be easily ruined by wind or rain.

SUMMARY OF THE INVENTION

It is therefore a primary object of the present invention to provide a heeling-in and transplanting means for plants, especially for ligneous plants, which is provided with suitable space and fixing means to facilitate the heeling-in and culturing of plant therein so that the growth of roots of the plant can be effectively induced and guided without entangling with each other; moreover, the roots can be easily, quickly and accurately trimmed before quick transplantation without reversely affecting the complete clod gripped by the roots.

Another object of the present invention is to provide a heeling-in and transplanting means for easy inducing and cutting the roots, the use of which includes only simple but effective steps that can be easily completed by general workers without specialized agricultural technique.

A further object of the present invention is to provide a heeling-in and transplanting means for easy inducing and cutting the roots, in which a sapling can extend its roots in a natural mode under proper inducing and limiting without entangling with each other and therefore can develop a roots spreading that enables the sapling to quickly adapt to the natural environment after it is transplanted.

A still further object of the present invention is to provide a heeling-in and transplanting means for easy inducing and cutting the roots, with which the roots of the sapling therein are limited within a transplanting bag while the main roots are effectively guided and induced to extend out of the transplanting bag in an almost free manner, permitting the sapling to grow in a natural and healthy way. Moreover, when the sapling is to be transplanted, accurate, rapid, and optimum root cutting may be done at obvious cutting points on the roots without reversely affecting the quick transplantation and the complete clod gripped by the roots.

A still further object of the present invention is to provide a heeling-in and transplanting means for easy inducing and cutting the roots, in which means are provided to adapt the present invention to the grown-up sapling and the roots thereof without inadequately limiting the natural extension of the roots.

BRIEF DESCRIPTION OF THE DRAWINGS

The detailed structure and the features of present invention can be best understood from the following detailed description of the preferred embodiment and the accompanying drawings wherein.

DETAILED DESCRIPTION OF THE PREFERRED EMBODIMENT

Figure 1:
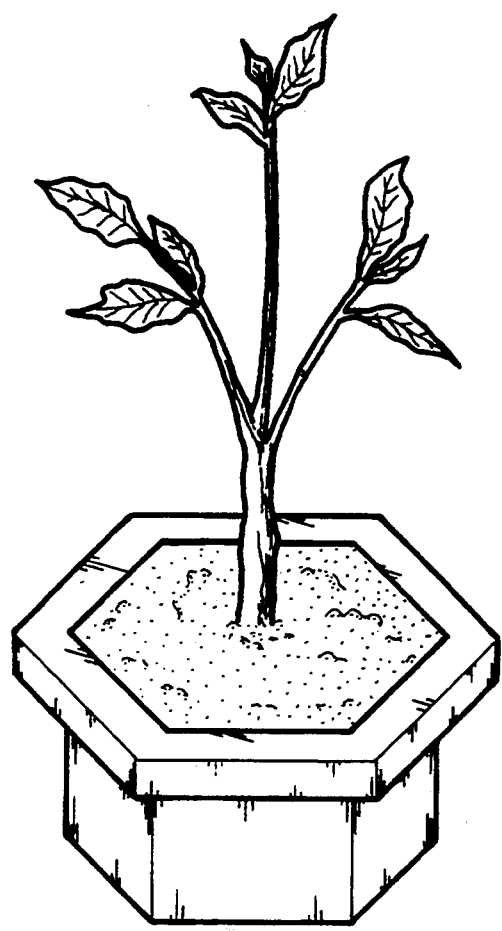
FIG. 1 illustrates a sapling heeled in a conventional culturing means used above the ground.
Figure 2A:
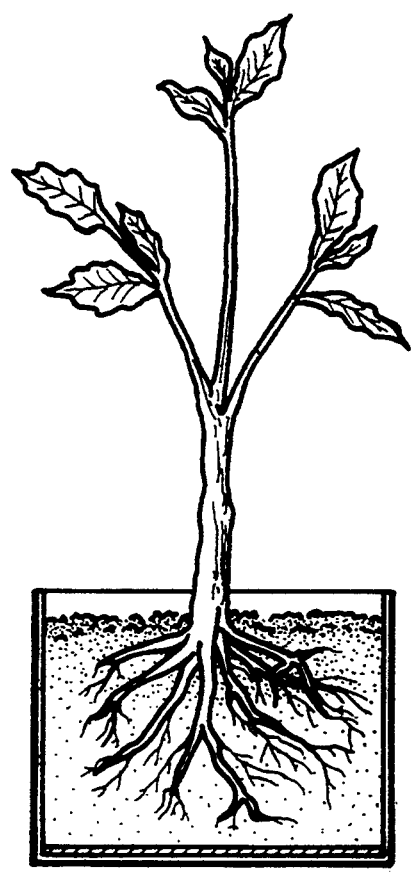
FIG. 2A illustrates a sapling heeled in a conventional transplanting bag for using under the ground.
Figure 2B:
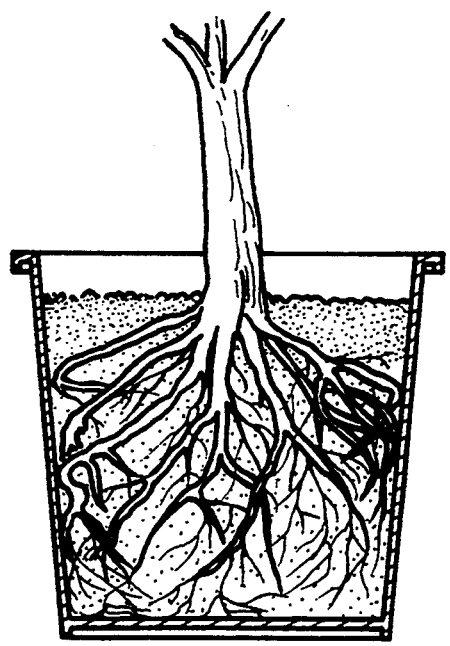
FIG. 2B illustrates the entangled roots of the sapling in the transplanting bag of FIG. 1.
Figure 3:
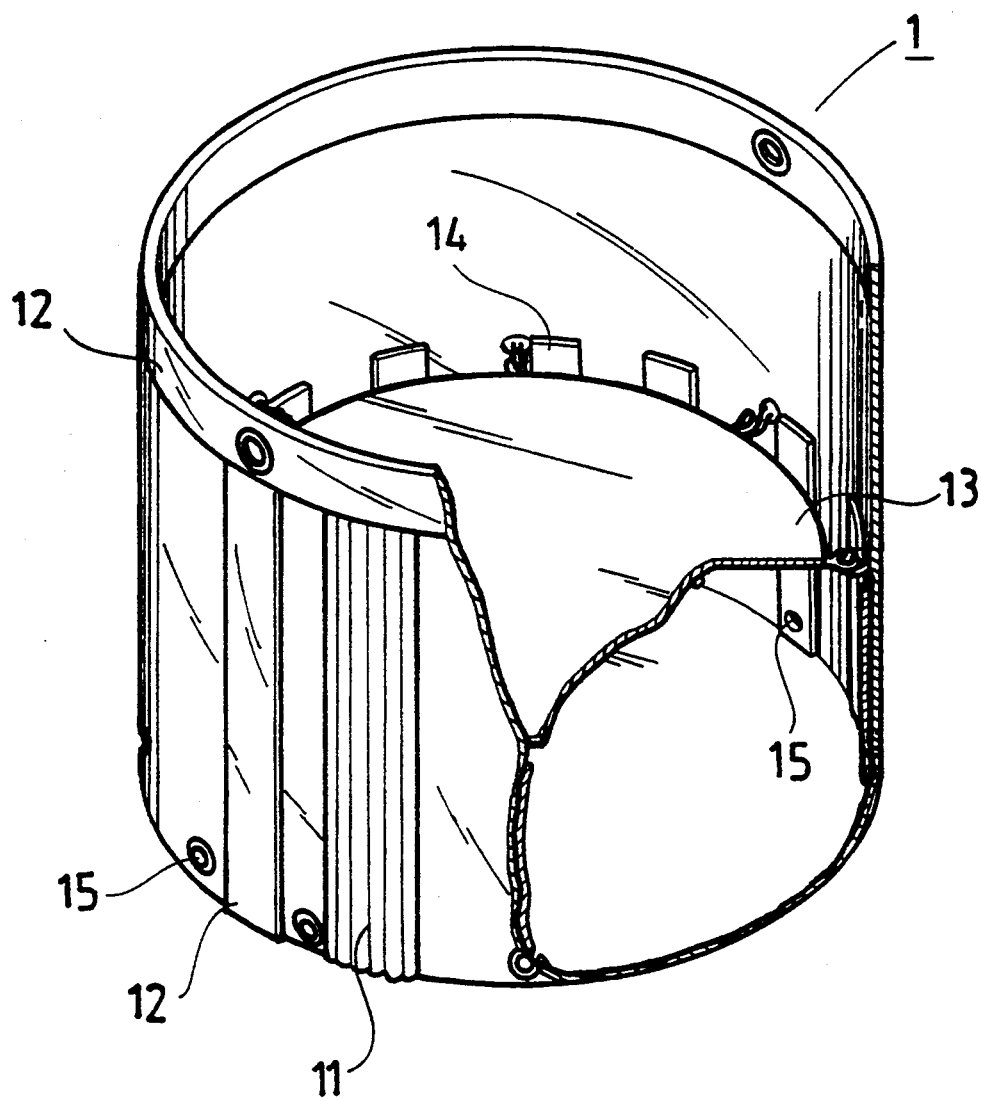
FIG. 3 is a perspective view of a culturing bag according to the present invention, in which a part of it is cut away for better description.
Figure 4:
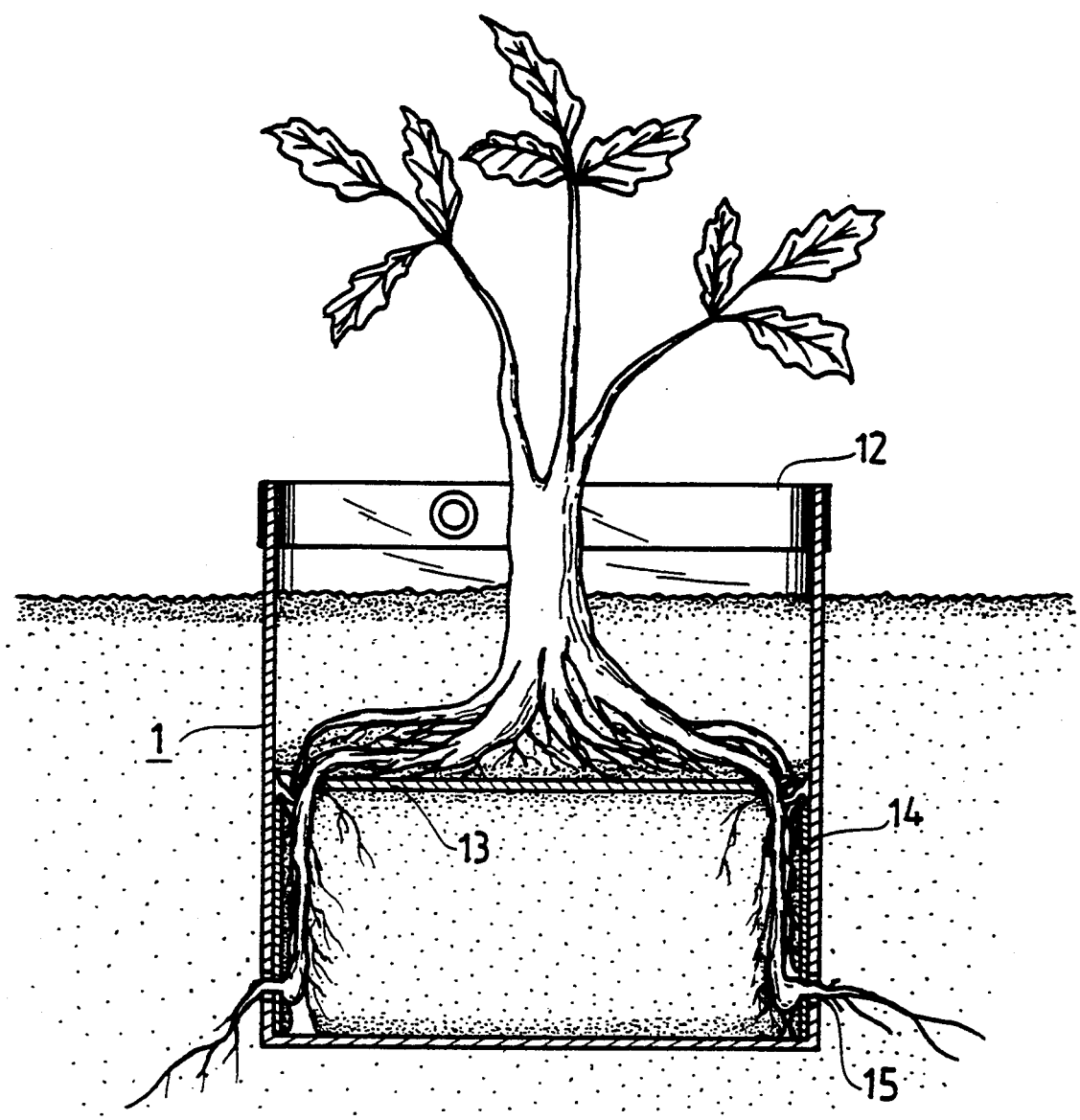
FIG. 4 is a vertical sectional view of FIG. 3, showing the extension of the roots of the sapling in the culturing bag of the present invention.

Please refer to FIG. 3. The present invention is mainly a culturing bag 1 into which a plant is heeled in for later transplantation. The culturing bag 1 is preferably made of anticorrosion material with proper tensile strength, such as finely woven nylon, non-woven cloth or plastic material, or carded or thermally pressed PP or other chemical fibre fabrics, so that the bag 1 can be made to have desired shapes and sizes and be capable of preventing main roots of the plant from passing through the bag 1. To adapt the bag 1 to roots of different sizes, a circle of reinforcing belt 12 with higher tensile strength and eyelets 12a, 12b may be attached to a top opening of the bag 1. Or, an extra reinforcing belt 12 passing under a bottom of the bag 1 with two ends oppositely fixed to the opening of the bag 1 may be further provided to facilitate the hanging of the bag 1 when the plant in the bag 1 is to be transplanted.

A partition 13 is detachably fixed to an inner wall of the bag 1 at fixing points 13a, 13b, etc. by means of hooks, adhesive tapes or other fastening means. The partition 13 is preferably fixed to the bag 1 at a distance about one third to one half of the height of the bag 1 from the bottom of the bag 1. The partition 13 is preferably made to have a size smaller than an inner diameter of the bag 1 by 1 to 3 cm and made of water-impervious material, such as plastic sheet or plate, polymeric material, acrylic board, nonwoven cloth, or other light-weight metal sheet.

Before the culturing bag 1 is to be used, first fix the partition 13 to the bag 1 at one or two fixing points 13a, 13b. Then, put the bag 1 in a planting hole predigged on the ground, lift the partition 13, fill in culture medium until a height as that of the partition 13 is reached, level off and slightly compact the culture medium, lower down the partition 13 and fix the same depending on actual need. Then, adequate amount or thickness of culture medium is further filled and a sapling to be grown is heeled in the bag 1. Finally, refill adequate amount of culture medium and properly compact the same, take some fixing or protective measures, if necessary, and sufficiently irrigate the bag 1.

The reduced diameter of the partition 13 provides a circle of annular gap between the partition 13 and the inner wall of the bag 1. When the roots of the sapling grow and extend, they shall first extend above the partition 13 horizontally and radially, and, when they are stopped by the wall of the bag 1, they shall naturally pass the gap between the partition 13 and the bag 1 to extend downward, forming a regular root pan without entangling with each other. This would be helpful to the sapling when it is transplanted to some other environment.

A plurality of water-soluble root-inducing nutrient stripes 14 are provided to the inner wall surface of the bag 1 between the bag bottom and the partition 13.

These nutrient stripes 14 are prepared from adequate amount of phosphate and potash fertilizers, humic acid, etc., blended with water-soluble adhesive agent to form a viscous concentrate. This viscous concentrate is applied to the lower inner wall of the bag 1 in vertical stripes or in linear spots. When the stripes or spots of viscous concentrate are dried and set, they form a roots-inducing nutrient zone below the partition 13. When the radially extended roots of the sapling in the culturing bag 1 above the partition 13 finally reach the gap between the partition 13 and the bag 1, they will be induced by the diffused water-soluble nutrient stripes or spots 14 applied to the inner wall of the bag 1, and follow the nutrient stripes or spots 14 to extend into the lower portion of the bag 1 below the partition 13, forming a net-like root system wrapping a clod therein, without entangling with other in the culturing bag 1.

A metal eyelet is provided near the immediate lower end of each roots-inducing nutrient stripe 14, ie. near and a little above the corner of the horizontal bag bottom and the vertical inner wall, to form a root guiding and cutting hole 15. When the roots of the sapling are induced and guided by the nutrient stripes 14 to the metal eyelet holes 15, they will naturally pass through the holes 15 to freely grow and extend outside the bag 1. Since the roots have sufficient room to receive good nutrient, the sapling may grow in good condition. Following the gradual thickening of the roots, a section of the roots restricted by the fixed metal eyelet holes 15 occurs tissue variation, that is, the section of the roots passing through the holes 15 can not get thicker in normal condition and shall have an unchanged small diameter. This reduced-diameter root section looks like wilted but it keeps normal absorption and transportation functions. Both the portions of roots before and behind the metal eyelet hole 15 are not reversely affected by the thinner root section in their normal tissue development.

When the sapling heeled in the culturing bag 1 is to be transplanted, first give it necessary trimming, and then lift it from the ground by using a digger to remove the soil surrounding the culturing bag 1. Near the bottom of the bag 1, the wilted portion of the roots near the metal eyelet holes 15 can be clearly seen. Due to restriction and squeezing by the metal eyelets, these wilted portions of roots have very fragile cuticle and bast and therefore, can be easily cut with a simple tool, such as a shovel. The entire sapling together with an integral and complete clod can therefore, be lifted and transplanted to a desired place. Before growing the plant, first remove the culturing bag 1. Due to a slower transfer of nutrient caused by the restriction from the metal eyelets, the roots developed in the bag 1 show a much stronger and lively state, which is obviously different from the thin, weak and aged roots of plants heeled in the conventional culturing bags. Plants heeled in the culturing bags 1 of the present invention have evenly, radially extended roots, and, after adequate root-cutting, can be safely and effectively transplanted with new buds soon appearing and roots strongly gripping the soil after plantation again.

The culturing bag for heeling in and transplanting sapling according to the present invention is distinctly different from the conventional transplanting bags in that the present invention takes into consideration of the growing nature of plants so that plants are well prepared when they are heeled in the bag according to the present invention and may easily adapt themselves to the possible environment after they are transplanted.

According to the above description, it can be seen that most of the conventional culturing bags for heeling in saplings are different in their appearance and material without any other means to provide any significantly special and effective functions. In contrast to the conventional culturing bags, the present invention provides many means to give the sapling heeled in the culturing bag the natural growing environment for the roots thereof to develop in a normal and healthy way.

The present invention has been described in details with particular reference to the preferred embodiment thereof, but it will be understood that variations and modifications can be made within the spirit and scope of the present invention as described hereinabove and as defined in the appended claims.

What is claimed is:

1. A heeling-in and transplanting means for easy inducing and cutting of roots comprising a culturing bag, characterized in that said culturing bag is provided near a middle portion thereof with a partition which guides roots of a plant heeled in said culturing bag to grow and extend evenly and radially above said partition and then downward along an innner periphery of said culturing bag, a plurality of water-soluble root-inducing nutrient stripes attached to said inner periphery of said culturing bag below said partition, and a plurality of externally communicable eyelets provided at a lower portion of said nutrient stripes for guiding and easy cutting of roots.

2. A heeling-in and transplanting means for easy inducing and cutting of roots as claimed in claim 1, wherein said eyelets for guiding roots are metal eyelets or eyelets formed with other material having adequate strength.

3. A heeling-in and transplanting means for easy inducing and cutting of roots as claimed in claim 1 wherein said partition is secured to said inner periphery of said culturing bag by connecting a plurality of hooks, fasteners, or adhesive means provided thereon to a plurality of corresponding and matching counterparts premounted on said culturing bag.

4. A heeling-in and transplanting means for easy inducing and cutting of roots as claimed in claim 1, wherein said partition and said inner periphery of said culturing bag have an annular gap between them.

5. A heeling-in and transplanting means for easy inducing and cutting of roots as claimed in claim 1, wherein said culturing bag is partially formed with elastic bands.

6. A heeling-in and transplanting means for easy inducing and cutting of roots as claimed in claim 1, wherein said culturing bag is provided at a top opening thereof a circle of first reinforcing belt with higher strength and spaced eyelets, and a second reinforcing belt passing under a bottom of said culturing bag with two ends oppositely fixed to said top opening of said culturing bag.

* * * * *